Dec. 27, 1949 — R. W. DEIMLER — 2,492,557
FISHHOOK
Filed Nov. 10, 1948
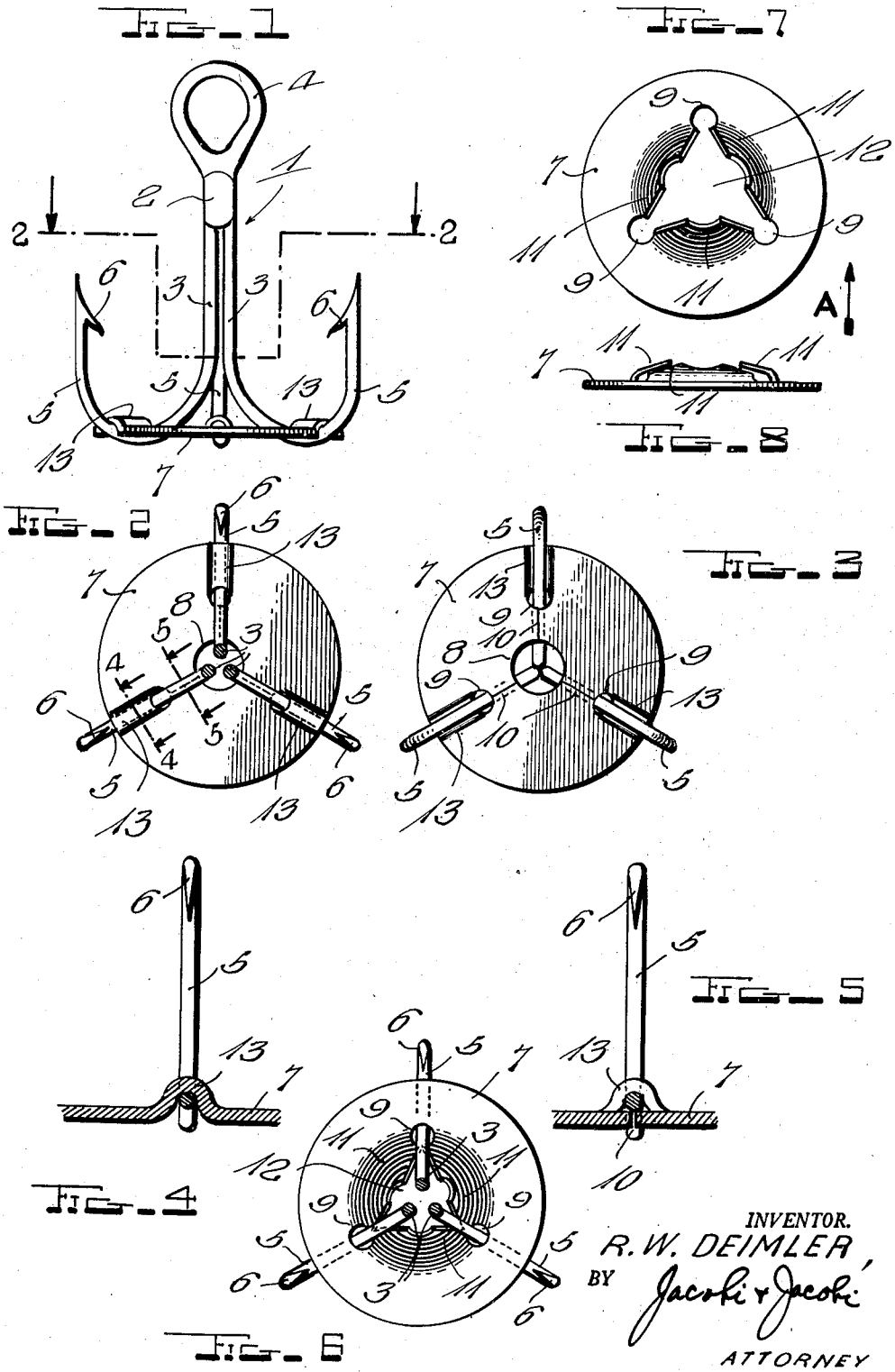
INVENTOR.
R. W. DEIMLER,
BY Jacobi & Jacobi
ATTORNEY Patented Dec. 27, 1949

2,492,557

UNITED STATES PATENT OFFICE 2,492,557

FISHHOOK

Ralph W. Deimler, Topeka, Kans.

Application November 10, 1948, Serial No. 59,291

6 Claims. (Cl. 43—44.8)

This invention relates to fish hooks and more particularly to a fish hook of the multiple prong type used for catching cat fish and to which soft bait is applied.

When fishing for cat fish or other fish of this type, hooks having a number of prongs or bills, usually three, are used and soft bait is applied to the hook. This bait, which is known as paste bait, may be formed of dough, cheese, chicken blood, and other substances of like nature and is of such consistency that it easily becomes dislodged from the hook when a cast is made and when fishing in running water having current of sufficient strength to wash the bait from the hook.

Therefore, one object of the invention is to provide a multiple prong hook with a plate which is mounted upon and extends between the prongs of the hook and serves as a backing for the paste bait and very effectively prevents it from being washed loose or otherwise dislodged from the hook.

Another object of the invention is to provide the hook with a plate which is stamped from sheet metal and may be easily applied to the hook and then firmly secured so that it remains in place with portions extending between the bills or prongs of the multiple hook.

Another object of the invention is to provide a plate which may be applied and secured to a multiple prong hook by means of a machine or applied by hand and portions bent into gripping engagement with prongs of the hook by use of a screw driver or similar tool.

Another object of the invention is to provide a plate which is of simple construction, easy to apply, and cheap to manufacture.

With these and other objects in view, the invention consists of a special construction and arrangement of parts illustrated in the accompanying drawings wherein:

Fig. 1 is a side view of a multiple prong hook having a bait supporting plate applied thereto.

Fig. 2 is a view taken along the line 2—2 of Fig. 1 and looking towards the plate.

Fig. 3 is a view looking at the bottom of a hook provided with the plate.

Fig. 4 is a sectional view taken along the line 4—4 of Fig. 2.

Fig. 5 is a sectional view taken along the line 5—5 of Fig. 2.

Fig. 6 is a view similar to Fig. 2 showing the plate applied to the hook but not secured thereon.

Fig. 7 is a top plan view of the plate before being applied to the hook.

Fig. 8 is a side view of the plate shown in Fig. 7.

The multiple hook indicated in general by the numeral 1 is of conventional formation and is a triple prong hook. This hook has a shank 2 formed from the shanks of the three hooks 3 and at its upper end the shank 2 is provided with the usual eye 4 through which fishing line is tied to connect the hook with the fishing line. The prongs 5 of the hooks 3 extend outwardly and upwardly from their shanks and terminate in the usual barbs 6.

When bait of the paste type is applied to a hook of the multiple prong type shown, it is engaged with the prongs or bills with most of the wad of bait extending between the prongs and when a cast is made, the wad of bait is liable to be dislodged from the hook or, if fishing is being done in running water, the current is liable to wash the bait from the hook.

In order to prevent this, I have provided my hook with a plate 7 which is formed of sheet metal and may be circular as shown, oval, square, or other desired shapes. This plate is formed with a center opening 8 and other openings 9 which are spaced from the center opening and between the center opening and the openings 9 are formed slits 10 which extend radially of the disk. After the openings and the slits have been formed in the disk, pressure is applied to the under face of the disk to force the portions 11 between the openings 9 upwardly and thus form the disk with a substantially conical central portion divided into spaced segments or triangular tongues formed by the said portions 11. This is clearly shown in Figures 6, 7, and 8, and referring to Fig. 6, it will be seen that the substantially triangular-shaped opening 12 formed through the plate when the tongues 11 are bent upwardly, is of such dimensions that the eye and shank of the hook 1 may be passed through this opening and the plate then slid downwardly along the shank 2 until the inner end portions of the prongs 5 pass through the opening and intermediate portions of the prongs pass through the openings 9 and engage the edge of the disk at points opposite the openings 9.

After the disk has been applied to the hook and is at rest upon the prongs 5, the tongues 11 are forced downwardly so that they are returned to a flattened position in the plane of the disk with their side edges meeting and disposed under the prongs so that portions of the disk between the center opening 8 and the openings 9 will be closed and the disk prevented from moving upwardly along the hook 1. The portions of the disk between the openings 9 and the marginal edge of the disk are crimped transversely of the prongs to form upwardly projecting ribs which are of inverted U-shape in cross section and form elongated seats 13 into which portions of the prongs between the openings 9 and the marginal edge of the disk fit. The disk will thus be prevented from having turning movement upon the multiple hook and the upstanding ribs will aid in preventing bait from being turned about the shanks and the inner end portions of the prongs of the three hooks 3 forming the multiple hook.

When a wad of paste-bait is applied to the multiple hook, it is pressed about the shanks and the inner end portions of the prongs of the hooks 3 and rests upon the plate. Therefore, all portions of the wad of bait will have engagement with a support and there will be no unsupported portions of the bait between the prongs. This will prevent the bait from being dislodged when a cast is made and flowing water will be prevented from washing away portions of the bait between the prongs of the multiple hook. The ribs cooperate with the inner end portions of the prongs to prevent the bait from being turned about the multiple hook and it will not be liable to work loose. The fact that the bait rests against the plate will also make it very difficult for a fish to suck the bait from the hook without being caught.

It will be understood that the disk may be manufactured as shown in Figures 7 and 8 and sold as an article of manufacture to be applied to multiple prong hooks.

From the foregoing description of the construction of my improved device, the operation thereof and the method of assembly will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. A multiple fish hook having a shank and prongs extending radially therefrom, and a disk carried by the prongs and bridging space between the prongs and serving as a support for paste-bait, said disk being formed with openings, and the prongs of the hook being passed downwardly through the openings and under the disk radially thereof and upwardly from marginal edge portions of the disk.

2. A multiple fish hook having a shank and prongs extending radially therefrom, and a disk carried by the prongs and bridging space between the prongs and serving as a support for paste-bait, said disk being formed with openings, the prongs of the hooks being passed downwardly through openings in the disk and upwardly from marginal edge portions of the disk, portions of the disk over the prongs being crimped to form upstanding ribs open along their under sides and constituting seats in which portions of the prongs under the disk fit and brace the disk against turning movement about the hook.

3. A multiple fish having a shank and prongs extending radially therefrom, and a disk carried by the prongs and bridging space between the prongs and serving as a support for paste-bait, said disk being formed with openings, the prongs of the hooks being passed downwardly through the openings in the disk and upwardly from marginal edge portions of the disk, portions of the disk over the prongs being crimped and disposed in straddling relation to the prongs, and portions of the disk inwardly of the openings being disposed under the prongs and preventing upward movement of the disk along the hook.

4. A multiple fish hook having a shank and prongs extending radially therefrom, and a disk carried by the prongs and bridging space between the prongs and serving as a support for paste-bait, said disk being formed with openings spaced transversely from each other and with slits extending from the openings inwardly of the disk and dividing the disk into tongues extending towards the center of the disk, said tongues being initially bent upwardly between the openings, said disk being disposed about the hook with the prongs extending downwardly through the openings and under the disk to marginal portions thereof and upwardly from the disk, said tongues being bent downwardly to a flattened position with their side edge portions meeting under portions of the prongs inwardly of the openings and preventing upward movement of the disk along the hook, and portions of the disk over the prongs being crimped transversely and disposed in straddling relation to the prongs to prevent turning movement of the disk about the hook.

5. A multiple fish hook having a shank and prongs extending radially therefrom, and a disk carried by the prongs and bridging space between the prongs and serving as a support for paste-bait, said disk being formed with openings spaced transversely from each other and with a center opening, there being slits extending radially of the disk between the center opening and the first mentioned openings and defining tongues having the first openings at corners of their attached ends, the tongues being bent upwardly, the disk being disposed about the hook with the prongs extending downwardly through the first mentioned openings and under the disk radially thereof and portions of the disk over the prongs crimped and straddling the prongs, and said tongues being bent downwardly between the prongs with their side edge portions meeting under the prongs.

6. A bait-supporting disk for a fish hook provided with a plurality of prongs extending outwardly from a vertical shank; said disk being formed of sheet metal and having a central opening and smaller openings adapted to surround curved portions of the hook, portions of the disk between the margin thereof and the small openings being arched upwardly to provide clamps for the curved portions of the hook, and said disk having slits between the center opening and the smaller openings to permit portions of the disk adjacent the slits to be bent to allow passage of the shank through the central portion of the disk when applying the disk to the hook.

RALPH W. DEIMLER.

REFERENCES CITED

The following references are of record in the file of this patent:

UNITED STATES PATENTS

| Number | Name | Date |
| --- | --- | --- |
| 419,054 | Mayer | Jan. 7, 1890 |
| 779,751 | Waitt | Jan. 10, 1905 |
| 810,789 | Moss | Jan. 23, 1906 |
| 916,421 | Crittenden | Mar. 30, 1909 |
| 2,273,582 | Maire | Feb. 17, 1942 |